Oct. 12, 1948.    F. M. ALLEN ET AL    2,451,269
FLEXIBLE TUBING JOINT
Filed Sept. 22, 1944    2 Sheets-Sheet 1
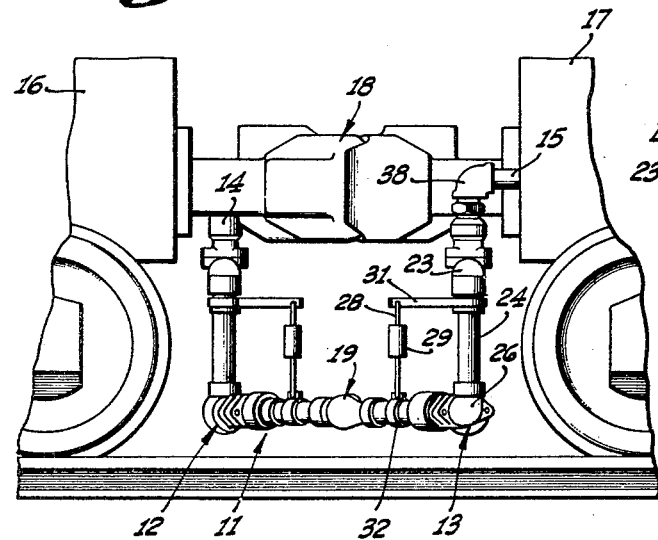
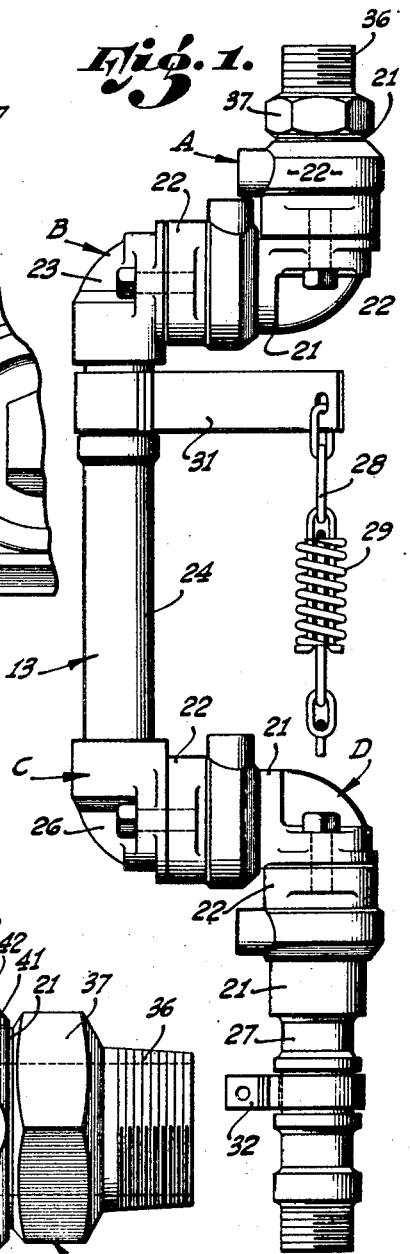
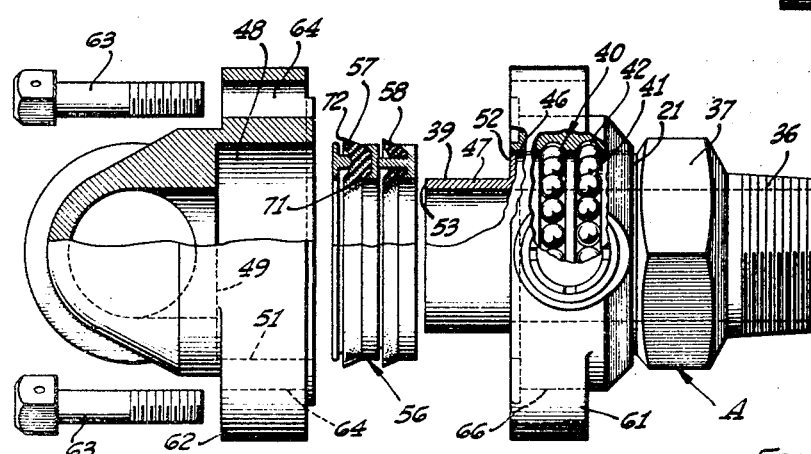
Frank M. Allen,
Robert E. Snyder,
INVENTORS.
BY Stuart M. Maule
ATTORNEY.

Oct. 12, 1948.  F. M. ALLEN ET AL  2,451,269
FLEXIBLE TUBING JOINT
Filed Sept. 22, 1944  2 Sheets-Sheet 2

FRANK M. ALLEN,
ROBERT E. SNYDER,
INVENTORS.

BY

ATTORNEY.

Patented Oct. 12, 1948

2,451,269

UNITED STATES PATENT OFFICE 2,451,269

FLEXIBLE TUBING JOINT

Frank M. Allen, Azusa, and Robert E. Snyder, Pasadena, Calif., assignors to The All-Flex Corporation, Los Angeles, Calif., a corporation of California Application September 22, 1944, Serial No. 555,278

11 Claims. (Cl. 285—97.3)

This invention relates to swivel pipe joints or couplings, and has for an object the provision of an improved arrangement of the packing which is employed to prevent leakage of fluid through the interstice between the relatively movable sections of a swivel joint for pipe or tubing.

A more detailed object is to provide a swivel joint of the character indicated wherein the packing employed for the purpose of preventing leakage through the interstice between the relatively movable sections of the joint is accessible without the necessity of disconnecting and separating the load-carrying sections from each other, thus avoiding the necessity, inherent in more conventionally constructed swing joints, of disturbing the bearing whereby the sections are revolubly interconnected, each time the packing is inspected, repaired, or replaced.

A further object of our present invention is to provide an improved form of packer for use in a swing joint of the character indicated and comprising a set of packing rings assembled in predetermined cooperative relation within a retaining shell in the form of a unitary cartridge or packaged packer adapted for rapid and facile replacement in the swing joint whenever the necessity arises.

Another object of the invention is to provide a flange coupling between the two parts of the female section whereby the packer recess may be rapidly and easily opened to inspect and/or replace the packaged packer.

The invention possesses other objects and valuable features, some of which, with those enumerated, will be set forth in the following description of the preferred embodiment of our invention illustrated in the drawing accompanying and forming a part of the specification. It is to be understood that we do not limit ourselves to the showing made by said drawing and description but that we may adopt variations of the preferred form within the scope of our invention as defined by the claims.

Referring to the drawings:

Figure 1 is a view in side elevation of a length of tubing for fluid under pressure, to which extreme flexibility has been imparted by the incorporation therein of four of the flexible tubing joints incorporating the principles of the present invention.

Figure 2 is a view in side elevation of a pair of railroad cars coupled together and showing the respective air lines of the two cars interconnected by two lengths of flexible tubing such as that illustrated in Figure 1, joined together with a standard railroad type quick-disconnect coupling.

Figure 3 is an enlarged, exploded view of one of the flexible pipe joints by means of which flexibility is imparted to the air line connector of Figure 1, portions of the Figure being broken away and shown in section, the better to disclose the interior construction.

Figure 4:
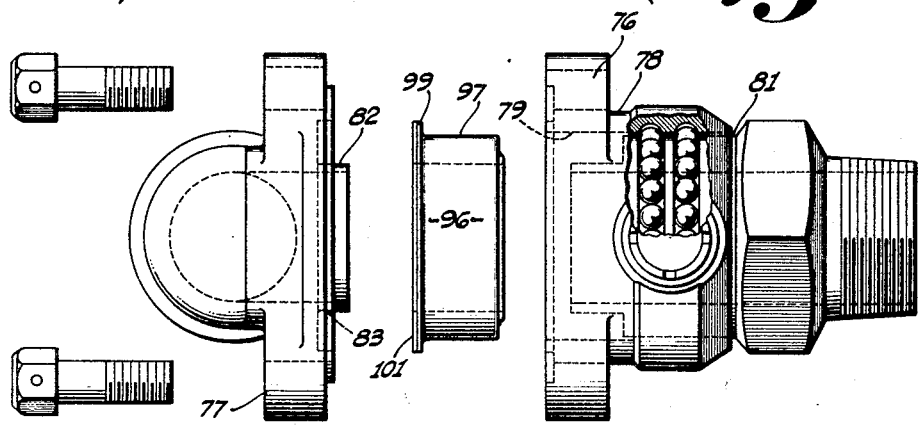
Figure 4 is a view similar to Figure 3, but illustrating a slightly modified form of construction and showing the packaged packer.

So severe are the operating conditions under which the flexible tubing commonly employed to interconnect the air, steam, and water lines of adjacent railroad cars of an assembled train that attempts to design a flexible pipe joint for such use have been abandoned in favor of a flexible hose having a "quick-locking" coupling incorporated therein; and the use of such a flexible coupling has become practically universal for railroad use in spite of the disadvantages inherent in any hose for fluid under pressure and exposed to all kinds of weather for prolonged periods. Among the disadvantages of packed swivel joints for pipe or tubing that in the past have caused their disqualification for railroad service is the fact that in order to gain access to the packing for the purpose of inspection, repair or replacement, the known designs of couplings required disassembly of the joint, including disturbing the bearing whereby the relatively movable sections of the joint are revolubly interconnected. Consequently, in order to repack a joint of this character in the past, the services of a skilled mechanic, and the removal of a car from operating service, would be required for so long a period that the railroads have considered it preferable to employ the well-known coupling hoses rather than substitute the mechanically better pipes coupled by flexible joints characterized by the difficult servicing problem to which reference has been made.

The flexible joint for pipe or tubing of the present invention has been designed particularly with this difficulty in view; and Figures 1 and 2 illustrate a coupling tube composed of rigid conduit elements interconnected by several of our improved joints in such a manner as to impart at least as great a degree of flexibility to the coupling tube as is afforded by a coupling tube composed of rubber hose. It should be understood, however, that the joint of our invention is here being illustrated and described as a part of a flexible air line coupling only in an exemplary, and not in a limiting sense, inasmuch as the joint is applicable with equal convenience and efficiency to steam lines and water lines, and, in fact, to any number of other uses and associations without departure from the scope of the present invention.

The coupling referred to is indicated in its entirety in Figure 2 at 11 and comprises a pair of sections 12 and 13, respectively, semi-permanently connected to the air lines 14 and 15, respectively, of adjacent railroad cars 16 and 17, respectively, which cars are interconnected in the usual manner by a conventional draw bar and coupling mechanism indicated at 18. Each of the sections 12 and 13 of the air line connector is provided with one half of a "quick-disconnect" coupling 19, preferably of conventional design adapted to interconnect the sections 12 and 13 with a substantially fluid-tight engagement and with their respective bores in communication and to disconnect the sections merely by rotating them with respect to each other through substantially 90°. This is usually accomplished in practice merely by lifting the joined ends of the coupling sections 12 and 13 from their Figure 2 position until each end has been rotated through substantially 45°.

Inasmuch as the two coupling sections 12 and 13 preferably are of identical construction, it will suffice for the purpose of the present disclosure to describe but one of them, say the section 13, which is illustrated in enlarged detail in Figure 1. It comprises preferably four of our improved swing joints or flexible pipe couplings indicated respectively at A, B, C, and D. Each of these swing joints A, B, C, and D comprises a male section 21 fitted telescopically within a female section 22 with respect of which it is freely revoluble, and in the installation illustrated in Figures 1 and 2, the female element 22 of the joint A is integrally connected to the male element 21 of the joint B. Here again, however, the construction is described only in an illustrated sense, inasmuch as this type of interconnection between the adjacent joints A and B is merely for economy of space in the completed assembly and has no bearing on the manner in which either of the interconnected joints, A, B, operates. In a similar manner, the male section 21 of the joint B and the female section 22 of the joint D are integrally united. In each case these integrally united male and female sections of adjacent joints are disposed with their respective axes offset 90° with respect to each other, with the result that whereas the axis about which the movable, female portion 22 of the joint A rotates is vertical, the axis about which the movable portion of the joint B rotates is horizontal. Consequently, the nipple 24 extending from the movable portion of the joint B is normally held by gravity in position hanging vertically downwards from the joint B as indicated in both Figures 1 and 2. The joint C is similarly provided with a 90° bend 26, with the result that the axis about which its movable portion rotates is horizontal. Consequently, the joint D and the conduit 27 by means of which the outer end of the joint D is connected to the associated half of the "quick-disconnect" coupling 19 would be permitted to hang vertically downwards from the joint C as illustrated in Figure 1 were it not for the presence of a linkage 28 including spring member 29 which interconnects a horizontal bracket 31 extending rigidly from the nipple 24 and another bracket 32 rigid with the conduit 27.

As far as interior construction and manner of operation are concerned, all of the joints, A, B, C, and D are identical and, therefore, here again it will suffice for the purpose of the present disclosure to describe but one of them, for example the joint A shown in Figure 3, the male section 21 of which is provided upon its outer end with a threaded coupling 36 and preferably a non-circular wrench-receiving portion 37 which serves in connecting the male coupling element 21 of the joint A to a suitable fitting 38 rigid with the air line 15 of the associated car 17. The other end 39 of the male section 21 is telescopically received within the female element 22 to which it is connected for relative rotary movement by a suitable bearing, preferably in the form of a double row of antifriction balls 40 suitably engaged within aligned ball races 41 and 42 in the male section 21 and in the female section 22, respectively.

Whereas that portion of the interstice 46 between the joint sections 21 and 22 where the antifriction bearings 40 are located is relatively narrow, the interstice 46 is widened as indicated at 47 by providing a relieved portion in one or both of the joint sections. In the form illustrated, it is entirely within the extended inner end 53 of the male joint section 21 that the interstice 46 is relieved to provide this widened portion. By widening the interstice 46 in any one of the manners indicated, a packing recess 48 is provided, one end wall 49 and the outer circumferential wall 51 of which are defined by interior surfaces within the female coupling element 22, whereas the other end wall 52 and the inner circumferential surface of which are defined by exterior surfaces on the male coupling element 21.

Suitable packing means indicated in its entirety at 56 is installed within the packing recess 48, and this packing means 56 may take any of several different forms without departing from the essence of the present invention. For example, the packing means 56 in one of its more simple forms may comprise merely a pair of cooperative packing rings 57, 58, designed in conformity with the disclosure in co-pending application, Serial No. 430,066, filed February 9, 1942, now Patent No. 2,384,360, dated September 4, 1945. However, the purposes of the present invention are better served by employing a packing wherein the several constituent elements are assembled into a unitary cartridge construction such as those illustrated in Figures 5, 6, and 7, to be described in greater detail hereinafter. Regardless of the type of packing means 56 selected, the joint of the present invention is so designed as to afford convenient access to the packing chamber 48, thus affording much greater convenience in performing the operations of inspecting, removing, and replacing the packing element 56 as compared to more conventional swing joint constructions wherein it is necessary to disturb the bearing by means of which the joint sections are revolubly interconnected. Toward this end, the female joint section 22 comprises two separable parts, to wit, a body portion 61 and a cap portion 62, rigidly but releasably interconnected as by means of a plurality of cap screws 63 extending through clearance holes 64 in the cap 62 and threaded within aligned holes 66 in the body portion 61, preferably on diametrically opposite sides with respect to the bore of the joint.

Thus it may be seen that we have provided a packed swing joint wherein complete access to the packing may be gained by the exceedingly simple and brief expedient of removing two cap screws 63 and then merely moving the cap portion 62 away from the body portion 61 of the female coupling element 22. As will readily be understood, this operation is performed without disturbing the antifriction bearings 40 in any manner whatsoever, or in fact in any other portion of the joint. Consequently, the packing 56 can be removed and thoroughly inspected and repaired, if need be, or replaced within a minimum of time, and with a minimum of inconvenience. Furthermore, the operation is of such a simple nature that the services of a skilled mechanic are not required for its performance.

It will be observed that in the modifications of swing joint illustrated in Figure 3, the plane along which the cap 62 is removable from the body 61 intersects the packing recess 48 substantially in planar alignment with the end wall or shoulder 52 on the male joint section 21. It also will be observed that both packing rings 57 and 58 are provided with inner and outer fluid-sealing lips 71 and 72, respectively, which establish fluid-sealing engagement with the inner circumferential wall 53 and the outer circumferential wall 51, respectively, of the packing chamber 48. Consequently, the packing rings 57 and 58 operate to prevent leakage of fluid along either circumferential wall of the packing chamber and toward the right as viewed upon Figure 3 with the result that leakage is prevented both through the interstice 46 along which relative motion between the two joint sections 21 and 22 occurs and through whatever interstice may remain between the body portion 61 and the cap portion 62 of the female joint section 22. Therefore, even if a prefectly fluid-tight seal between the body 61 and cap 62 does for any reason exist after the cap screws 63 are tightened, the joint is so designed that no leakage can there occur.

However, in the modification illustrated in Figure 4 additional means are provided for preventing leakage between the body portion 76 and the cap portion 77 of the female joint section 78. In this modification, at least a major portion of the packing recess 79 lies within the body portion 76 inasmuch as the plane along which the cap portion 77 is removable from the body portion 76 intersects the packing recess 79 at or adjacent that end of the packing recess 79 which is remote from the male joint section 81. On the inner face of the cap portion 77 a tubular extension 82 is provided, long enough to extend beyond one or more packing rings within the recess, and it is intended that that packing ring or those packing rings, as the case might be, beyond which the extension 82 projects are arranged with their pressure-responsive faces facing toward the end of the extension 82. When so arranged that packing ring or rings, as the case might be, lying between the end of the projection 82 and the remainder of the cap 77 will prevent leakage of fluid from within the joint and toward the left,as viewed upon Figure 4 along the inner circumferential wall 83 of the packing recess. At least one of the other rings within the recess 79 is oppositely disposed, i. e., presents a pressure responsive face facing to the left as viewed upon Figure 4 so that that ring prevents leakage of fluid toward the right as viewed in that figure.

Figures 5, 7:
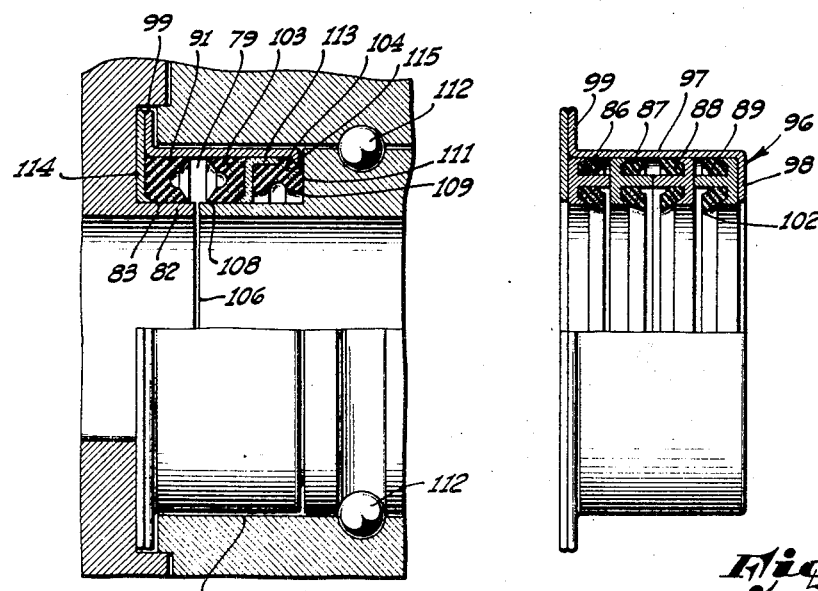
Figure 5 is a more highly enlarged, detail view in longitudinal section taken on a radial plane through one of the flexible pipe joints of the present invention and showing a preferred type of unitary or packaged packing member installed in operative relation therein.
Figure 7 is a view similar to Figure 6 showing a completely assembled unitary or packaged packing cartridge of slightly modified form.
Figure 6:
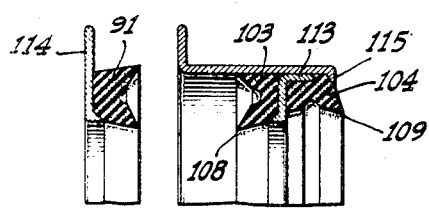
Figure 6 is a detail view similar to Figure 5, but taken through the packing member only and indicating the manner of assembly thereof.

The packing illustrated in Figure 7 is provided with two packing rings 86, 87, facing toward the right and two packing rings 88 and 89 facing to the left, whereas modification of Figures 5 and 6 is equipped with a packing ring 91 arranged to prevent escape of fluid from within the joint and to the left along the inner circumferential wall 83 of the packing recess 79.

Each of the modifications of packing members illustrated in Figures 5 and 6 and in Figure 7, respectively, incorporate an important detail of the present invention, inasmuch as each is preassembled into a unitary, cartridge construction, which can be placed in operative position within the packing recess 79 with the greatest convenience, and still with utmost surety that the constituent packing rings will be so disposed with respect to each other within the recess 79 that they will operate with utmost efficiency.

Referring first to the packer assembly illustrated in Figure 7, the oppositely disposed rings 86, 87, 88, and 89 are mounted in the position which they should occupy with respect to each other when finally assembled in the joints and retained in those positions until such assembly is effected through the expedient of a rigid shell or casing 96. This casing 96 comprises a body portion 97 substantially of cylindrical form and having an inwardly extending flange 98 at one end and an outwardly extending flange 99 at the other end. A closure plate or cap 101 preferably in the form of a flat annulus is permanently affixed to the end flange 99 after the packing rings have been assembled within the body portion 97. Any suitable means for attachment of the cap 101 to the flange 99 may be employed such as spot welding, soldering, or the like. The packing rings 88 and 89 both present sealing lips 102 which engage the inner circumferential wall of the packing chamber 79 and thereby prevent escape of fluid along that wall and to the right as viewed upon Figure 7. In Figures 5 and 6, however, although there are two packing rings 103 and 104 to the right of that portion 106 of the interstice between joint sections, which extends from the packing recess 79 to the bore 107 of the joint, only the packing ring 103 presents a sealing lip 108 which engages the inner circumferential wall of the chamber 79. The other packing ring 104 presents a sealing lip 109 which engages the radially disposed end wall or shoulder 111 of the packing chamber 79 and inasmuch as this lip 109 establishes sliding as well as sealing engagement with the radial wall 111, it will provide surety of the leakproof nature of the joint, even though there may be an extent of mechanical imperfection in the anti-friction bearing 112 of the joint which would prevent an appreciable degree of radial movement of one joint section with respect to the other. Any axial movement of one joint section with respect to the other is compensated for as far as the leakproof nature of the joint is concerned by the fact that the sealing lip 108 of the other ring 103 engages the circumferential wall so that sliding therebetween can occur without disturbing the leakproof nature of the engagement.

In the case of the modification illustrated in

Figures 5 and 6, also, the packing unit or cartridge is of a preassembled nature since its packing rings 91, 103 and 104 are permanently disposed therein in their desired operating position in the factory and retained so by the shell 113 and the closure plate or cap 114 which are preferably similar to the first described shell 97 and cap 101, with the exception that the shell 113 is provided with a relatively narrow end wall 115 on its inner end to prevent the sealing lip 109 of the packing 104 from making engagement with the end wall 111 of the packing recess.

Figure 6 illustrates a preferred manner of assembly of the packing rings of either modification within their retaining shell. The innermost packing, say the packing rings 103 and 104, is mounted within the shell 112 before the cap 114 is affixed thereto; and preferably the other innermost packer 83, is affixed to the inner face of the cap 114 as by vulcanizing, with the result that the steps of assembly of the rings within their casing are facilitated to the greatest possible degree.

We claim:

1. A flexible joint for interconnecting a pair of tubes, comprising a tubular female joint section affixed to one of said tubes and a tubular male joint section revolubly fitted thereinto and affixed to the other of said tubes, bearing means interconnecting said joint sections for relative rotary motion and restraining them against relative axial motion, said sections having an interstice therebetween and at least one of said joint sections having a relieved portion defining an annular recess of predetermined fixed size from which said interstice leads to the exterior of said joint, packing within said recess making fluid-sealing engagement with both of said joint sections, one of said joint sections comprising two portions separable to give access to said packing recess, and means releasably interconnecting said separable portions comprising cooperating flanges on said separable portions, and quickly releasable means rigidly interconnecting said flanges.

2. A flexible joint for interconnecting a pair of tubes, comprising a tubular female joint section affixed to one of said tubes and a tubular male joint section revolubly fitted thereinto and affixed to the other of said tubes, antifriction means interconnecting said joint sections for relative rotary motion and restraining them against relative axial motion, said sections having an interstice therebetween and at least one of said joint sections having a relieved portion defining an annular recess of predetermined fixed size from which said interstice leads to the exterior of said joint, said antifriction means extending across said interstice between said recess and the exterior of said joint, packing within said recess making fluid-sealing engagement with both of said joint sections, one of said joint sections comprising two portions separable to give access to said packing recess, and means releasably interconnecting said separable portions comprising cooperating flanges on said separable portions, and quickly releasable means rigidly interconnecting said flanges.

3. A flexible joint for interconnecting a pair of tubes, comprising a tubular female joint section affixed to one of said tubes and a tubular male joint section revolubly fitted thereinto and affixed to the other of said tubes, bearing means interconnecting said joint sections for relative rotary motion and restraining them against relative axial motion, said sections having an interstice therebetween and a portion of said interstice between said bearing means and the intersection of said interstice with the bores of said joint sections being of increased width to present an annular packing recess, and a pre-assembled packing unit within said recess and comprising an annular shell and a plurality of packing rings retained in predetermined fixed position with respect to each other by said shell, said female joint section comprising a body portion and a cap portion rigidly secured thereto but separable therefrom in a plane intersecting said packing recess whereby said packer unit can be removed from said recess by removal of said cap portion from said body portion and without disturbing said bearing means.

4. A flexible joint for interconnecting a pair of tubes, comprising a tubular female joint section affixed to one of said tubes and a tubular male joint section revolubly fitted thereinto and affixed to the other of said tubes, bearing means interconnecting said joint sections for relative rotary motion and restraining them against relative axial motion, said sections having an interstice therebetween and a portion of said interstice between said bearing means and the intersection of said interstice with the bores of said joint sections being of increased width to present an annular packing recess, and a pre-assembled packing unit within said recess and comprising an annular shell and a plurality of packing rings retained in predetermined fixed position with respect to each other by said shell, two of said rings being disposed on opposite sides of the plane of intersection of said recess and the portion of said interstice between said recess and the bore of said joint and both of said oppositely disposed rings having their pressure-responsive face facing toward said plane, said female joint section comprising a body portion and a cap portion rigidly secured thereto but separable therefrom in a plane intersecting said packing recess whereby said packer unit can be removed from said recess by removal of said cap portion from said body portion and without disturbing said bearing means.

5. A flexible joint for interconnecting a pair of tubes, comprising a tubular female joint section affixed to one of said tubes and a tubular male joint section revolubly fitted thereinto and affixed to the other of said tubes, bearing means interconnecting said joint sections for relative rotary motion and restraining them against relative axial motion, said sections having an interstice therebetween and a portion of said interstice between said bearing means and the intersection of said interstice with the bores of said joint sections being of increased width to present an anular packing recess, and a pre-assembled packing unit within said recess and comprising an annular shell and a plurality of packing rings retained in predetermined fixed position with respect to each other by said shell, a fluid-sealing lip on one of said packing rings making sliding engagement with a circumferential wall of said recess to establish a fluid-tight seal therewith during both rotary and limited axial movement of one of said joint sections with respect to the other, and a fluid-sealing lip on another of said packing rings making sliding engagement with a radial wall of said recess to establish a fluid-tight seal therewith during both rotary and limited radial movement of one of said joint sections with respect to the other, said female joint section comprising a body portion and a cap portion rigidly secured thereto but separable therefrom in a plane intersecting said packing recess whereby said packer unit can be removed from said recess by removal of said cap portion from said body portion and without disturbing said bearing means.

6. In a device for releasably interconnecting the train pipes on two adjacent railroad cars, the combination of a "quick-disconnect" coupling and flexible means connecting each of said train pipes to said coupling comprising a pair of rigid tubes and a flexible joint for interconnecting said tubes comprising a tubular female joint section affixed to one of said tubes and a tubular male joint section revolubly fitted thereinto and affixed to the other of said tubes, bearing means interconnecting said joint sections for relative rotary motion and restraining them against relative axial motion, said sections having an interstice therebetween and at least one of said joint sections having a relieved portion defining an annular recess of predetermined fixed size from which said interstice leads to the exterior of said joint, packing within said recess making fluid-sealing engagement with both of said joint sections, one of said joint sections comprising two portions separable to give access to said packing recess, means releasably interconnecting said separable portions comprising cooperating flanges on said separable portions, and quickly releasable means rigidly interconnecting said flanges.

7. In a flexible train pipe connector, the combination of one section of a two part "quick-disconnect" coupling and a flexible means for connecting said coupling section to a train pipe comprising a pair of rigid tubes and a flexible joint interconnecting said tubes, comprising a tubular female joint section affixed to one of said tubes and a tubular male joint section revolubly fitted thereinto and affixed to the other of said tubes, antifriction means interconnecting said joint sections for relative rotary motion and restraining them against relative axial motion, said sections having an interstice therebetween and at least one of said joint sections having a relieved portion defining an annular recess, of predetermined fixed size, from which said interstice leads to the exterior of said joint, said antifriction means extending across said interstice between said recess and the exterior of said joint, packing within said recess making fluid-sealing engagement with both of said joint sections, one of said joint sections comprising two portions separable to give access to said packing recess, means releasably interconnecting said separable portions comprising cooperating flanges on said separable portions, and quickly releasable means rigidly interconnecting said flanges.

8. A flexible joint for interconnecting a pair of tubes, comprising a tubular female joint section affixed to one of said tubes and a tubular male joint section revolubly fitted thereinto and affixed to the other of said tubes, bearing means interconnecting said joint sections for relative rotary motion and restraining them against relative axial motion, said sections having an interstice therebetween and a portion of said interstice between said bearing means and the intersection of said interstice with the bores of said joint sections being of increased width to present an annular packing recess, and a pre-assembled packing unit within said recess and comprising a cylindrical shell having an end flange extending outward therefrom and a plurality of packing rings retained in predetermined fixed position with respect to each other by said shell and a closure plate rigidly secured to said flange, said female joint section comprising a body portion, a cap portion cooperating with said body portion to close said recess, and releasable means for securing said cap portion to said body portion in recess-closing position, said cap portion having a recess therein for the reception of said flange and closure plate of said packing unit.

9. A flexible joint for interconnecting a pair of tubes, comprising a tubular female joint section affixed to one of said tubes and a tubular male joint section revolubly fitted thereinto and affixed to the other of said tubes, bearing means interconnecting said joint sections for relative rotary motion and restraining them against relative axial motion, said sections having an interstice therebetween and a portion of said interstice between said bearing means and the intersection of said interstice with the bores of said joint sections being of increased width to present an annular packing recess, a pre-assembled packing unit within said recess and comprising a cylindrical shell having an end flange extending outward therefrom and a plurality of packing rings retained in predetermined fixed position with respect to each other by said shell and a closure plate rigidly secured to said flange, said female joint section comprising a body portion, a cap portion cooperating with said body portion to close said recess, and releasable means for securing said cap portion to said body portion in recess-closing position, said cap portion having a recess therein for the reception of said flange and closure plate of said packing unit, and a cylindrical boss on said body portion coaxially disposed with respect to the bore thereof, said cap portion having a recess therein within which said flange, closure plate, and boss are seated.

10. A flexible joint for interconnecting a pair of tubes, comprising a tubular female joint section affixed to one of said tubes and a tubular male joint section revolubly fitted thereinto and affixed to the other of said tubes, bearing means interconnecting said joint sections for relative rotary motion and restraining them against relative axial motion, said sections having an interstice therebetween and a portion of said interstice between said bearing means and the intersection of said interstice with the bores of said joint sections being of increased width to present an annular packing recess, a pre-assembled packing unit within said recess and comprising a cylindrical shell having an end flange extending outward therefrom and a plurality of packing rings retained in predetermined fixed position with respect to each other by said shell and a closure plate rigidly secured to said flange, said female joint section comprising a body portion, a cap portion cooperating with said body portion to close said recess, and releasable means for securing said cap portion to said body portion in recess-closing position, said cap portion having a recess therein for the reception of said flange and closure plate of said packing unit, and a cylindrical boss on said body portion coaxially disposed with respect to the bore thereof, said cap portion having a recess therein within which said flange, closure plate, and boss are seated, and said boss being substantially fitted to said cap portion's recess to maintain axial alignment of said cap and body portions.

11. A flexible joint for tubing comprising a female joint section, a male joint section revolubly fitted thereinto and comprising a body portion, a cap portion, and means for releasably affixing said cap portion to said body portion, bearing means interconnecting said body portion and said male joint section and restraining them against relative axial movement, cooperative and coaxially aligned extensions on said male joint section and said cap portion defining the inner wall of a packing recess, the outer wall of said packing recess being defined by said female joint section, and packing means disposed within said recess comprising a pair of annular packers facing oppositely with respect to each other and making sealing engagement, respectively, with said cylindrical extensions.

FRANK M. ALLEN.
ROBERT E. SNYDER.

REFERENCES CITED

The following references are of record in the file of this patent:

UNITED STATES PATENTS

| Number | Name | Date |
|---|---|---|
| 689,990 | Regester | Dec. 31, 1901 |
| 1,936,804 | Stein | Nov. 28, 1933 |
| 2,049,063 | Hubbard | July 28, 1936 |
| 2,214,261 | Roth | Sept. 10, 1920 |
| 2,312,341 | King | Mar. 2, 1943 |
| 2,396,123 | Phillips | Mar. 5, 1946 |

FOREIGN PATENTS

| Number | Country | Date |
|---|---|---|
| 302,044 | Great Britain | Dec. 13, 1928 |
| 538,593 | Great Britain | Aug. 11, 1941 |